March 7, 1944.　　　R. E. OLSON　　　2,343,317
APPARATUS FOR GOVERNING DEAERATION
Filed April 4, 1941　　　2 Sheets-Sheet 1
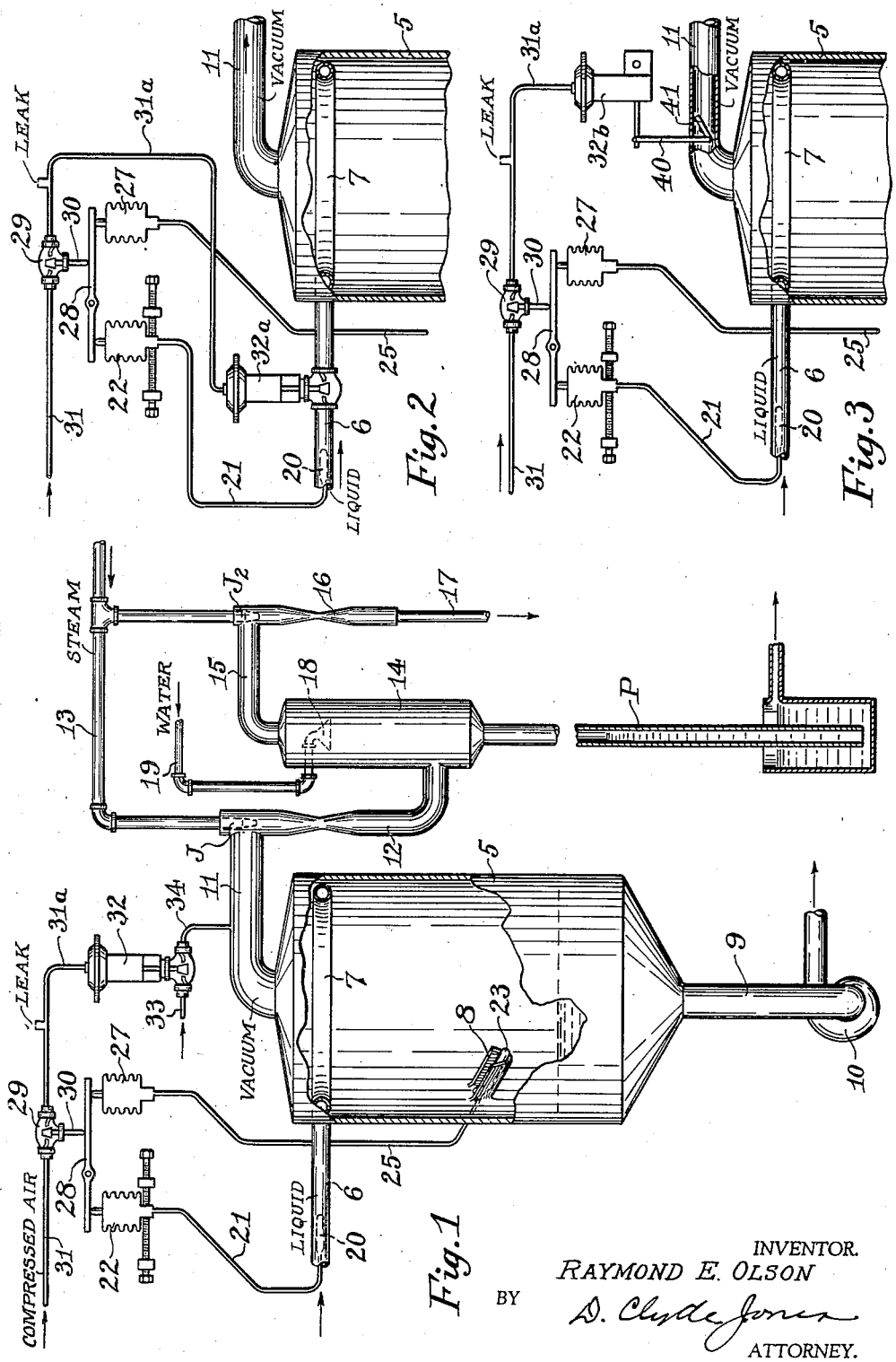
INVENTOR.
RAYMOND E. OLSON
BY D. Clyde Jones
ATTORNEY.

March 7, 1944.  R. E. OLSON  2,343,317
APPARATUS FOR GOVERNING DEAERATION
Filed April 4, 1941  2 Sheets-Sheet 2
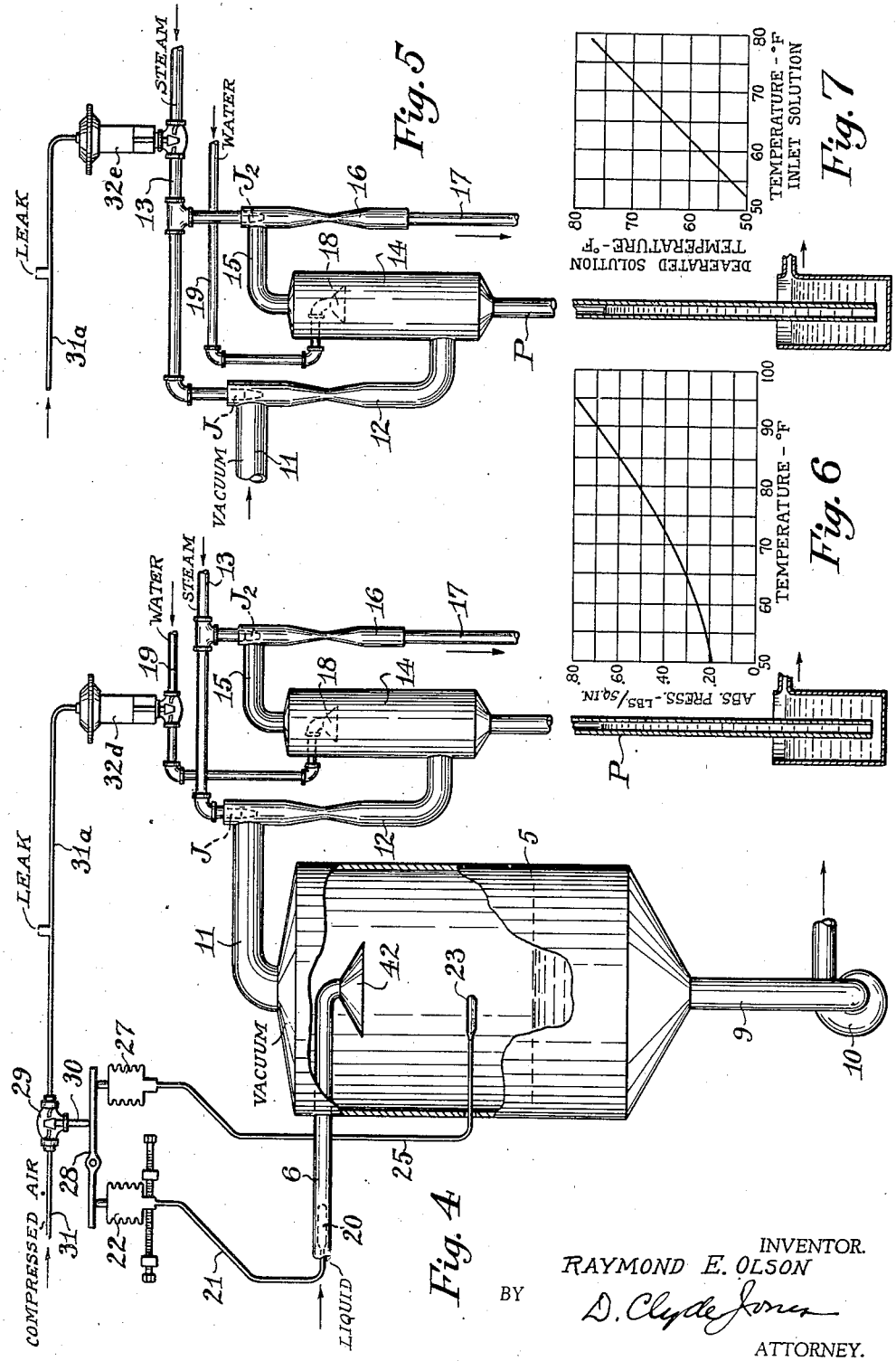
INVENTOR.
RAYMOND E. OLSON
BY
D. Clyde Jones
ATTORNEY.

Patented Mar. 7, 1944

2,343,317

UNITED STATES PATENT OFFICE 2,343,317

APPARATUS FOR GOVERNING DEAERATION

Raymond E. Olson, Pittsford, N. Y., assignor to Taylor Instrument Companies, Rochester, N. Y., a corporation of New York Application April 4, 1941, Serial No. 386,891

1 Claim. (Cl. 183—2.5)

This invention relates to a method of and to apparatus for governing the deaeration of a solution.

In many processes, notably in the treatment of viscose and in the processing of milk, it is desirable to remove air entrapped therein. In the case of viscose it is important to remove this entrapped air, since it tends to oxidize the solution, while in the case of milk, it has been found that the entrapped air tends to change the flavor of the milk and also tends, during pasteurization, to cause reduction of the vitamin content of the milk. The air entrapped in such solutions is preferably swept away in the water vapor generated by boiling the water in the solution at a subatmospheric pressure. However, the amount of water vapor removed should be accurately controlled, since in the case of viscose the concentration of the solution would be materially changed, and in the case of milk all water removed represents a financial loss inasmuch as fluid milk is bought and sold by volume.

In former systems for controlling deaeration it has been customary to immerse the bulb of the controller in the deaerated solution. Such a position of the bulb is unsatisfactory inasmuch as the level of the deaerated liquid in the tank varies from time to time. Therefore the temperature response of the controller is not uniform, because there would be a relatively prompt response if the bulb is just immersed under the surface of the liquid, whereas if this bulb were deeply submerged in the liquid there would be a slow response. Consequently it has been proposed to provide a liquid level controller for maintaining a given level of the liquid in the tank. However, the addition of a liquid level controller to an installation is not only expensive in initial cost but in maintenance service.

In accordance with the present invention, a novel control method is provided in which the differential relation between the temperature of the solution introduced in the deaerating chamber and the temperature of a small amount of the fully cooled solution, is utilized to govern the amount of water vapor removed from the solution.

A further feature of the invention relates to a novel arrangement of the elements of a control system useful in governing the deaeration of a solution.

In the drawings, Fig. 1 diagrammatically represents a deaerating system and apparatus for controlling the same; Fig. 2 is a fragment of a diagrammatic showing of a modified form of the invention similar to that illustrated in Fig. 1 but in which deaeration is controlled by controlling the amount of liquid introduced into the deaerator; Fig. 3 is a fragment of a further modified form of the invention wherein the degree of vacuum in the tank is variably controlled; Fig. 4 is a diagrammatic showing of another modified form of the invention wherein the degree of vacuum in the tank is controlled by varying the flow of shower water to the barometric condenser; Fig. 5 is a fragment of a modified form of the invention in which the degree of vacuum in the deaerating tank is governed by variably controlling the supply of steam to the injectors of the barometric condenser; and Figs. 6 and 7 are charts useful in explaining the invention.

In the drawings, 5 generally designates a deaerating tank into which a solution to be deaerated is introduced through an inlet pipe 6 communicating with an annular spray head provided with openings or jets to project the solution as a spray into the top portion of the tank 5. Some of this spray accumulates as a liquid film on the side wall of the tank and flows as a film into a trough 8 located on the inside of the wall of the tank about the upper middle portion of the distance from the top to the bottom of the tank. The liquid collects in the trough 8 and then flows to the bottom of the tank where it accumulates as a main body of deaerated solution. The bottom of the tank 5 is provided with an outlet pipe 9 to which there is connected a pump 10 for advancing the solution through the tank.

The closed top of the tank 5 communicates through an exhaust pipe 11 which is connected to a suitable exhaust device. Although it will be understood that any device for creating subatmospheric pressures of a uniform value in the tank, may be utilized, a barometric condenser is herein illustrated, for this purpose. This barometric condenser includes an injector tube 12 into the upper end of which steam from the pipe 13 is introduced through the jet J. The lower end of the injector tube 12 discharges into the lower portion of the condensing chamber 14. The bottom of the chamber 14 is provided with a drain pipe P, normally containing a column of water greater than thirty feet in height. The top of the chamber 14 communicates through the pipe 15 with the upper end of a second injector tube 16. The upper end of this injector tube likewise has steam introduced therein through the jet $J^2$ from the pipe 13, while the lower end of this tube communicates through the pipe 17 with the atmosphere. The upper portion of the condenser chamber 14 has a shower head 18 supplied with cooling water from the pipe 19. It will be understood that the construction of this barometric condenser is conventional and the diagrammatic showing thereof is merely for the purpose of illustrating the background of the invention.

It will be appreciated that when the solution in pipe 6 is discharged through the jets 7 into the low pressure atmosphere in the top of the tank 5, this solution will be deaerated by the "sweep out effect" of the water vapor evaporated from the solution. This evaporation of the water vapor is facilitated by the reduction of pressure in the tank to a value where the water in the solution boils at a relatively low temperature. Illustrated in Fig. 6 is the boiling point curve A for water at low absolute pressures. The coordinates are pressure and temperature, and each point on the curve indicates a pressure and corresponding temperature at which the water will change from the liquid to the vapor state. Boiling takes place since the total gas pressure on the liquid is less than the corresponding vapor tension. As the water evaporates a large amount of heat is absorbed which results in a cooling of the deaerated solution. The difference in temperature of the solution before and after deaeration is a measure of the amount of water vapor removed. Therefore, either the amount of solution introduced into the deaerating tank, or the degree of vacuum developed through the exhaust pipe 11, may be used to control the amount of water vapor and the amount of entrapped air withdrawn from the solution.

In accordance with the present invention, the difference in temperature of the solution before and after deaeration, is used to control the amount of water vapor removed from the solution. In order to effect this control, the bulb of a thermometer is introduced into the inlet pipe 6. As illustrated this thermometer comprises a metal tube system including the bulb 20 communicating through a capillary tube 21 with a pressure responsive unit, such as a bellows 22. This tube system is filled with a thermosensitive medium, such as a liquid or a liquid and its vapor.

The temperature of the liquid after it is deaerated, is determined by a thermometer having its bulb 23 introduced into the middle upper portion of the tank 5 above the highest expected level of the solution to be contained therein, preferably in the deaerated spray collected in the trough 8. This thermometer likewise comprises a tube system including a bulb 23 communicating through a capillary tube 25 with a pressure responsive unit, such as a bellows 27. This last-mentioned tube system also includes a thermosensitive fluid, which may be a liquid, or a liquid and its vapor. I have discovered that when the bulb 23 is thus subjected to a small volume or sheet of the liquid as it is being deaerated, the thermosensitive fluid in the bulb will accurately and rapidly indicate the true value of the changing temperature of this solution. Thus, a more accurate control of the operation can be effected.

The bellows 22 and the bellows 27 of the two thermometers, are located adjacent to each other so that the movable ends of these bellows are in engagement with the differential lever 28. A relay air valve 29 which is provided with a valve stem 30 in engagement with the differential lever 28, is opened or closed in accordance with the position of this lever. This relay valve controls the supply of compressed air or the like from the conduit 31 to the conduit 31a and thence to the diaphragm top of the motor valve 32. As shown in Fig. 1, the motor valve 32 controls the admission of air at atmospheric pressure from the pipe 33 into the branch pipe 34 which communicates with the outlet pipe 11. Thus the valve 32 adjustably controls the degree of vacuum in the pipe 11 and consequently in the tank 14, to maintain a given relation between the temperature at the thermosensitive bulbs 20 and 24.

Since the differential temperature between the solution before and after deaeration is used as the basis of control, the differential temperature must remain constant regardless of changes that may occur in the inlet solution temperature. The curve B in Fig. 7 illustrates the manner in which the control mechanism functions. The tube system with its bulb 20 located in the inlet pipe 6 adjusts the temperature control point of the deaerated solution; such that one increment change in the inlet temperature will produce one increment change in temperature of the deaerated solution. In this manner, the differential temperature is held constant.

In the modified form of the invention shown in Fig. 2, the degree of vacuum in the deaerating tank 5 is maintained uniform through the pipe 11. However, a motor diaphragm valve 32a is introduced in the inlet pipe 6 leading into the top of the tank 5. In this instance the bulb 20 is inserted in the inlet pipe 6 at the upstream side of the valve 32a. The differential temperature controller governs the degree of opening of the valve 32a so that in this instance the control of deaeration is effected by controlling the amount of liquid introduced into the tank 5.

In the modified form of the invention shown in Fig. 3, the control is effected by varying the degree of vacuum in the deaerating tank 5. In this form of the invention the differential temperature control system actuates a valve motor 32b which raises or lowers the link 40 to vary the opening of the pivoted damper 41. It will be appreciated in this arrangement that when the damper is open, a higher degree of vacuum will be maintained in the tank 5, whereas when the damper 41 is partially closed a poorer vacuum will prevail therein.

In the modified form of the invention shown in Fig. 4, the liquid to be deaerated is introduced into the top of the tank by means of a shower head 42. In this instance the bulb 23 of the temperature sensing device projects under the spray of the shower head 42, with the bulb located so that it will never be submerged in the deaerating liquid in the tank 5. In this arrangement the motor diaphragm valve 32d is inserted in the pipe 19 through which water is supplied to the shower head 18 in the condensing chamber of the barometric condenser. In this arrangement by varying the flow of the shower water, the degree of vacuum in the tank 5 may be varied at will.

Similarly, in the modified form of the invention shown in Fig. 5, the motor diaphragm valve 32e is inserted in the steam supply pipe 13 leading to the injectors J and J2. Likewise by varying the flow of steam, the degree of vacuum in the tank can be controlled.

It will thus be seen that by applicant's arrangement, the need for an expensive liquid level controller has been obviated and yet an accurate control of deaeration is effected.

I claim:

In a controlled deaerating system, a deaerating tank having a trough located at an intermediate point on the inside wall thereof above the maximum level of the treated solution in the tank, means including an untreated solution inlet pipe terminating in spray outlets in the upper portion of the tank, an outlet pipe for the treated solution communicating with the bottom of the tank, a vacuum pipe connectible to vacuum generating means and communicating with the top portion of the tank, a thermosensitive device responsive to the temperature of the untreated solution in the inlet pipe, a second thermosensitive device having its thermosensitive element located in said trough, and means responsive to the joint action of said devices for maintaining a given relation between the amount of untreated solution admitted into said tank through said inlet pipe and the degree of vacuum maintained in said vacuum pipe.

RAYMOND E. OLSON.